United States Patent [19]
Udagawa et al.

[11] Patent Number: 5,513,167
[45] Date of Patent: Apr. 30, 1996

[54] OPTICAL RECORDING APPARATUS

[75] Inventors: Toshiki Udagawa; Shunji Yoshimura; Masumi Ohta, all of Tokyo, Japan

[73] Assignee: Sony Corporation, Tokyo, Japan

[21] Appl. No.: 250,931

[22] Filed: May 31, 1994

Related U.S. Application Data

[63] Continuation of Ser. No. 743,351, Aug. 2, 1991, abandoned.

[30] Foreign Application Priority Data

Dec. 17, 1990 [JP] Japan .................... 1-330838

[51] Int. Cl.$^6$ .................................................. G11B 7/00
[52] U.S. Cl. .................................................. 369/116; 369/50
[58] Field of Search ...................... 369/116, 124, 369/100, 110, 54, 59, 13, 50; 360/114, 59

[56] References Cited

U.S. PATENT DOCUMENTS

| | | | |
|---|---|---|---|
| 4,646,103 | 2/1987 | Sugiyama et al. | 369/116 |
| 4,660,189 | 4/1987 | Tsukamura et al. | 369/116 |
| 4,796,250 | 1/1989 | Kobayashi et al. | 369/116 |
| 4,873,680 | 10/1989 | Chung et al. | 369/116 |
| 4,894,816 | 1/1990 | Sukeda et al. | 369/116 |
| 5,088,074 | 2/1992 | Sato | 360/59 |
| 5,109,373 | 2/1992 | Ohno et al. | 369/116 |
| 5,130,970 | 7/1992 | Ohta | 369/116 |
| 5,241,524 | 8/1993 | Lee | 369/116 |
| 5,255,007 | 10/1993 | Bakx | 369/116 |

FOREIGN PATENT DOCUMENTS

| | | |
|---|---|---|
| 0335486 | 2/1989 | European Pat. Off. |
| 5924452 | 5/1984 | Japan |
| 59-117743 | 7/1984 | Japan |
| 63-39138 | 2/1988 | Japan |
| 1-185839 | 7/1989 | Japan |

*Primary Examiner*—Nabil Z. Hindi
*Attorney, Agent, or Firm*—Jay H. Maioli

[57] ABSTRACT

An optical recording apparatus for recording a pulse signal on a recording medium by using a laser light beam, wherein, as shown in FIG. 4, for example, a pattern detecting circuit (31) is provided to detect a pulse pattern of a recording signal, and an amplitude of a succeeding signal pulse is decreased in accordance with a control signal from a memory (33) when a pulse interval is not more than a predetermined value to thereby decrease a radiation energy of a laser light pulse, whereby the influence of remaining heat of the recording medium due to a laser light pulse corresponding to a preceding laser light pulse is cancelled to make it possible to record a high-density pulse signal accurately.

4 Claims, 9 Drawing Sheets

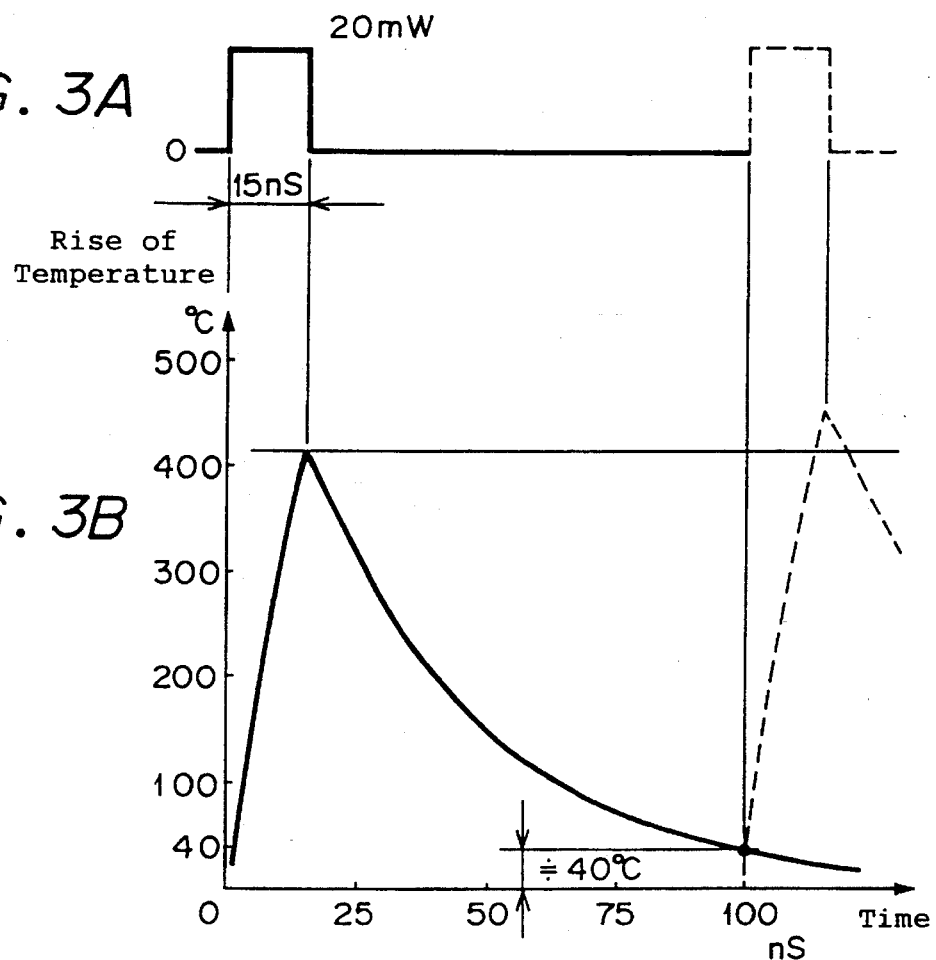

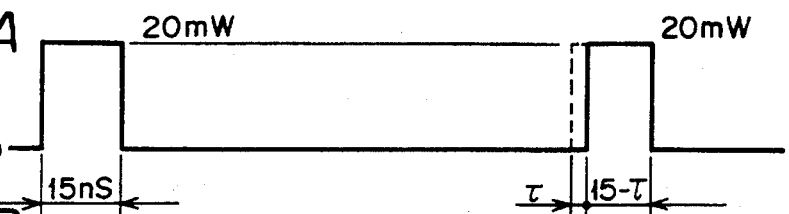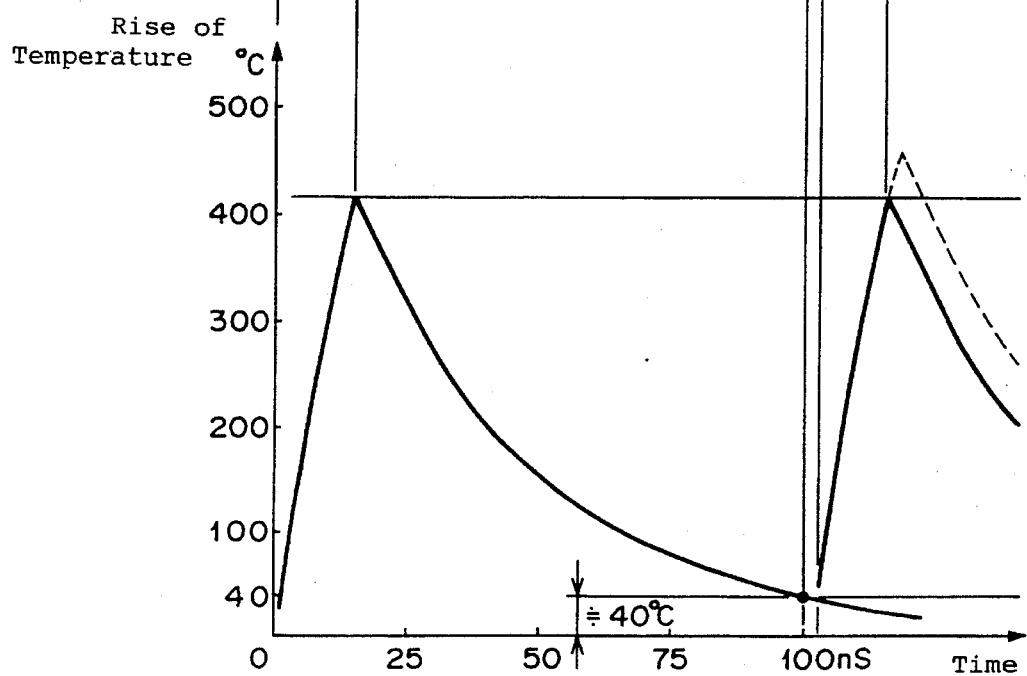

OPTICAL RECORDING APPARATUS

This is a continuation of application Ser. No. 07/743,351 filed Aug. 2, 1991, now abandoned.

TECHNICAL FIELD

The present invention relates to an optical recording apparatus capable of performing high-density recording by removing the influence of remaining heat of a recording medium due to a preceding laser light pulse radiated thereon.

BACKGROUND ART

Conventionally, there has been known an optical recording apparatus wherein a recording medium is heated by using energy of a laser light beam to change magneto-optical characteristics thereof to thereby record data thereon.

At first, a conventional optical recording apparatus will be explained with reference to FIGS. 1 and 2.

An example of the construction of the conventional optical recording apparatus is shown in FIG. 1. For simplifying the explanation, the explanation of various types of servo control circuits will be omitted in this conventional example of FIG. 1.

Referring now to FIG. 1, reference numeral 1 denotes a magneto-optical disc acting as an optical disc which is capable of rewriting data and rotated at a constant angular velocity or a constant linear velocity by a spindle motor 2. Reference numeral 10 denotes an optical head having a laser diode 11 and a photo diode 12 for writing data to (or reading data from) the magneto-optical disc 1. A magnetic head 10a acting as an external magnetic field supplying apparatus is disposed opposite the optical head 10 through the magneto-optical disc 1 in a manner that the magnetic head and the optical head sandwich the magneto-optical disc 1 in an opposite manner.

In this construction, the magnetizing direction of a part of a vertical magnetic recording film of the magneto-optical disc 1 where a laser light beam from the optical head 10 is radiated is changed in accordance with a direction of external magnetic field supplied from the magnetic head 10a.

Reference numeral 20 denotes a recording circuit system, wherein digital data as an information signal to be recorded on the magneto-optical disc 1 is supplied to an encoder 21 through an input terminal IN and converted not only into a predetermined format but also into a recording signal formatted with a modulation method such as a pulse position modulation, for example, by the encoder 21. The output of the encoder 21 is supplied to a light intensity modulation circuit 22 which in turn delivers an output signal to the laser diode 11 through a driving amplifier 23 to thereby intermittently control the intensity of radiated light from the diode.

A part of the laser light beam radiated from the laser diode 11 is reflected by a prism mirror and detected by the photo diode 12. The detected output of the photo diode 12 is supplied to a comparator 25 through an amplifier 24 and compared therein with a reference value applied from a reference value setting circuit 26. The output from the comparator 25 is fed back to the light intensity modulation circuit 22 to control the light intensity (power level) of the laser diode 11 at a constant value, thereby performing a so-called automatic power control (APC).

Now, with reference to FIG. 2, a method of forming a recording area (mark) in the conventional optical recording apparatus will be explained.

When the recording linear velocity of the magneto-optical disc 1 is 10 m/s, for example, a laser light with a power level of 10 mW and a pulse width of 50 nS, for example, is radiated from the diode 11 as shown in FIG. 2A, the temperature of a recording layer of the magneto-optical disc 1 increases and then decreases as shown in FIG. 2B, so that a mark with a length twice as large as the pulse width of the radiated laser beam, that is, a time length of 100 nS is recorded in the recording layer with a Curie point Tc of 180° C., for example, illustration thereof being omitted. In this case, the temperature of the recording layer corresponds to the center of radiation of the laser light beam whose energy density is accorded with Gausian distribution and is influenced also by thermal diffusion in the recording layer.

In the above-described example, as clear from FIG. 2B, at a time where a time period corresponding to a beam radiation length twice as large as the mark length, that is, 200 nS has lapsed after initial start of the radiation of the laser light beam, the temperature of the recording layer of the magneto-optical disc 1 has decreased to a value almost same as that before the beam radiation thereon, so that a succeeding mark can be formed without being influenced by the remaining heat generated when forming the preceding mark. Thus, the modulation method such as the pulse position modulation can be employed without any difficulty.

By the way, in order to perform a high-density recording, it has been proposed to set a recording linear velocity same as that of the above-described example and set a time interval of radiation of the laser light beam half of that of the above-described example, for example, that is 25 nS, thereby forming a mark with a time length of twice the radiation time interval, that is, 50 nS.

In this case, as known by JP-A-58-212628 filed by the same applicant as the present application, for example, due to the influence by the thermal diffusion of the recording layer, it is required to reduce a pulse width of the radiated laser light beam and to increase a power level thereof when compared with the above-described example. Namely, a laser light with a pulse width of 15 nS and a power level of 20 mW, for example, is radiated from the diode 11 as shown in FIG. 3A to thereby increase and then decrease a temperature of the recording layer of the magneto-optical disc 1 as shown in FIG. 3B to form a mark with a predetermined time length, that is, 50 nS.

In this case, however, as clear from FIG. 3B, at a time where a time period corresponding to a beam radiation length twice as large as the mark length, that is, 100 nS has lapsed after initial start of the radiation of the laser light beam, the time period lapsed after termination of the laser beam radiation is such a shorter value, as almost half of that of the above-described example, so that a temperature of the recording layer of the magneto-optical disc 1 merely decreases to a value higher by about 40° C. than a temperature at the initiation of the laser beam radiation.

This residual temperature increase, that is, remaining heat generated when forming the preceding mark is added to the temperature increase of the recording layer when forming a succeeding mark as shown by a dotted line in FIG. 3B, so that a time period required to reach to Curie point Tc in the recording layer is made shorter in a temperature rising mode and a time period required to reach to Curie point Tc in the recording layer is made longer in a temperature falling mode. Thus, front and rear edges of a mark to be formed are shifted to a front and a rear side from predetermined positions respectively and so a desired mark can not be formed accurately, whereby there was such a problem that an error occurs in data reproduced from the marks in the modulation method of the pulse position modulation type.

DISCLOSURE OF INVENTION

Accordingly, it is an object of the present invention to provide an optical recording apparatus which is capable of recording a high-density pulse signal accurately on a recording medium by cancelling influence of remaining heat of the recording medium due to a laser light pulse corresponding to a preceding pulse signal.

To this end, an optical recording apparatus according to the present invention is constructed in a manner that, in an optical recording apparatus wherein a modulation signal based on recording data is supplied to a light intensity modulation circuit 22 for a laser light source 11 and a light beam from the laser light source thus modulated is radiated on an optical recording medium 1 to record data thereon, pattern detecting means 31 for detecting a pulse pattern of the modulation signal is provided, and when the pattern detecting means detects a signal pulse with an interval not more than a predetermined value, an amplitude of a signal pulse succeeding to the pulse is decreased.

According to another aspect of the present invention, an optical recording apparatus according to the present invention is constructed in a manner that, in an optical recording apparatus wherein a modulation signal based on recording data is supplied to a light intensity modulation circuit 22 for a laser light source 11 and a light beam from the laser beam source thus modulated is radiated on an optical recording medium 1 to record data thereon, pattern detecting means 31 for detecting a pulse pattern of the modulation signal and pulse width control means 36 for controlling a pulse width of the modulation signal are provided, and when the pattern detecting means detects a signal pulse with an interval not more than a predetermined value, a pulse width of a signal pulse succeeding to the pulse is shortened.

Thus, according to the present invention, influence of remaining heat of the recording medium due to a laser light pulse corresponding to a preceding signal pulse is cancelled to thereby record a high-density pulse signal accurately on a recording medium.

BRIEF DESCRIPTION OF DRAWINGS

FIG. 3 is a timing chart for explaining the present invention, FIG. 8 is a timing chart for explaining an operation of another embodiment of the present invention.

BEST MODE FOR CARRYING OUT THE INVENTION

An embodiment of an optical recording apparatus according to the present invention will be explained hereinafter with reference to FIGS. 4 and 5.

Figure 1:
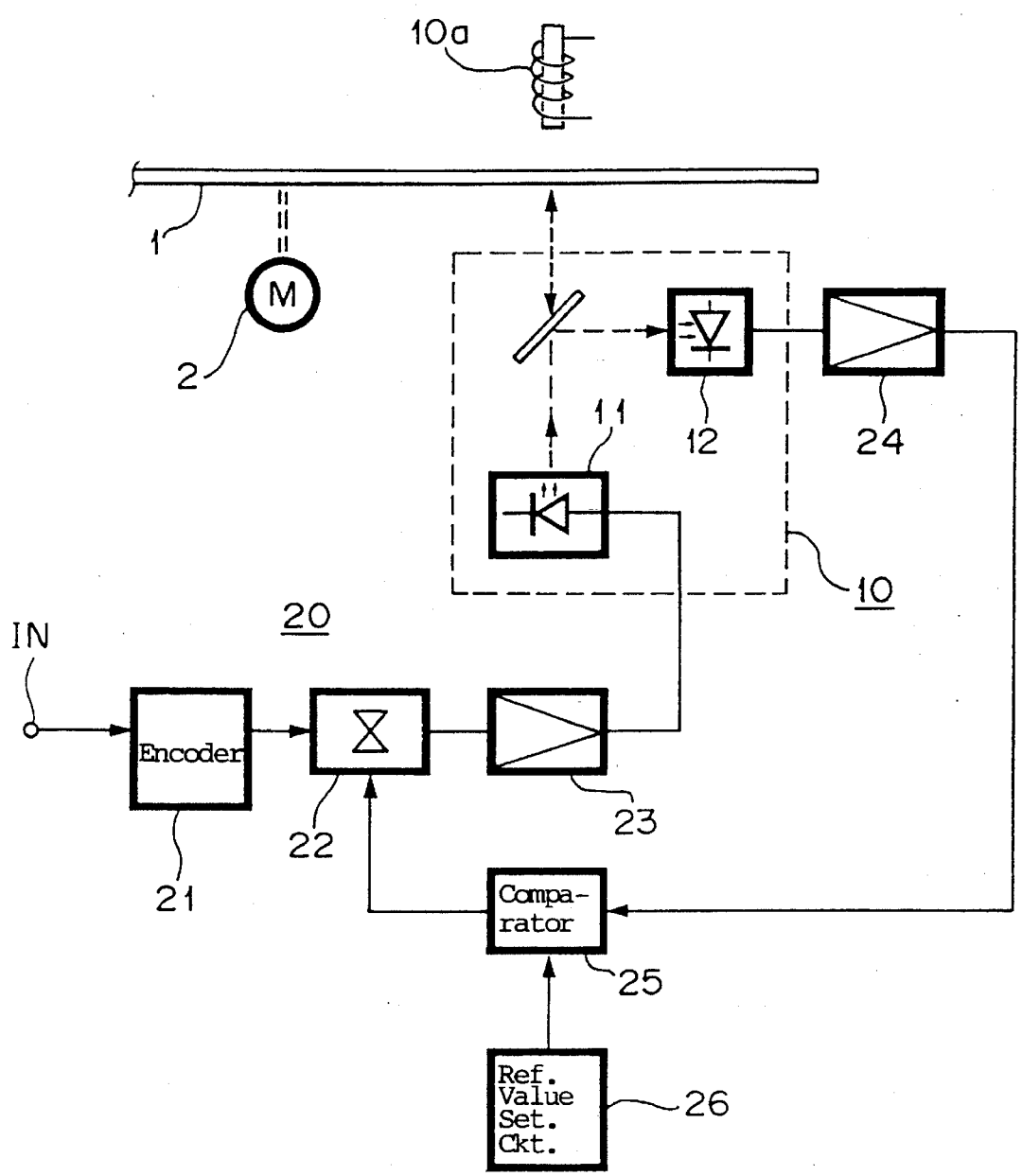
FIG. 1 is a block diagram illustrating the construction of an example of a conventional optical recording apparatus.
Figures 2A, 2B:
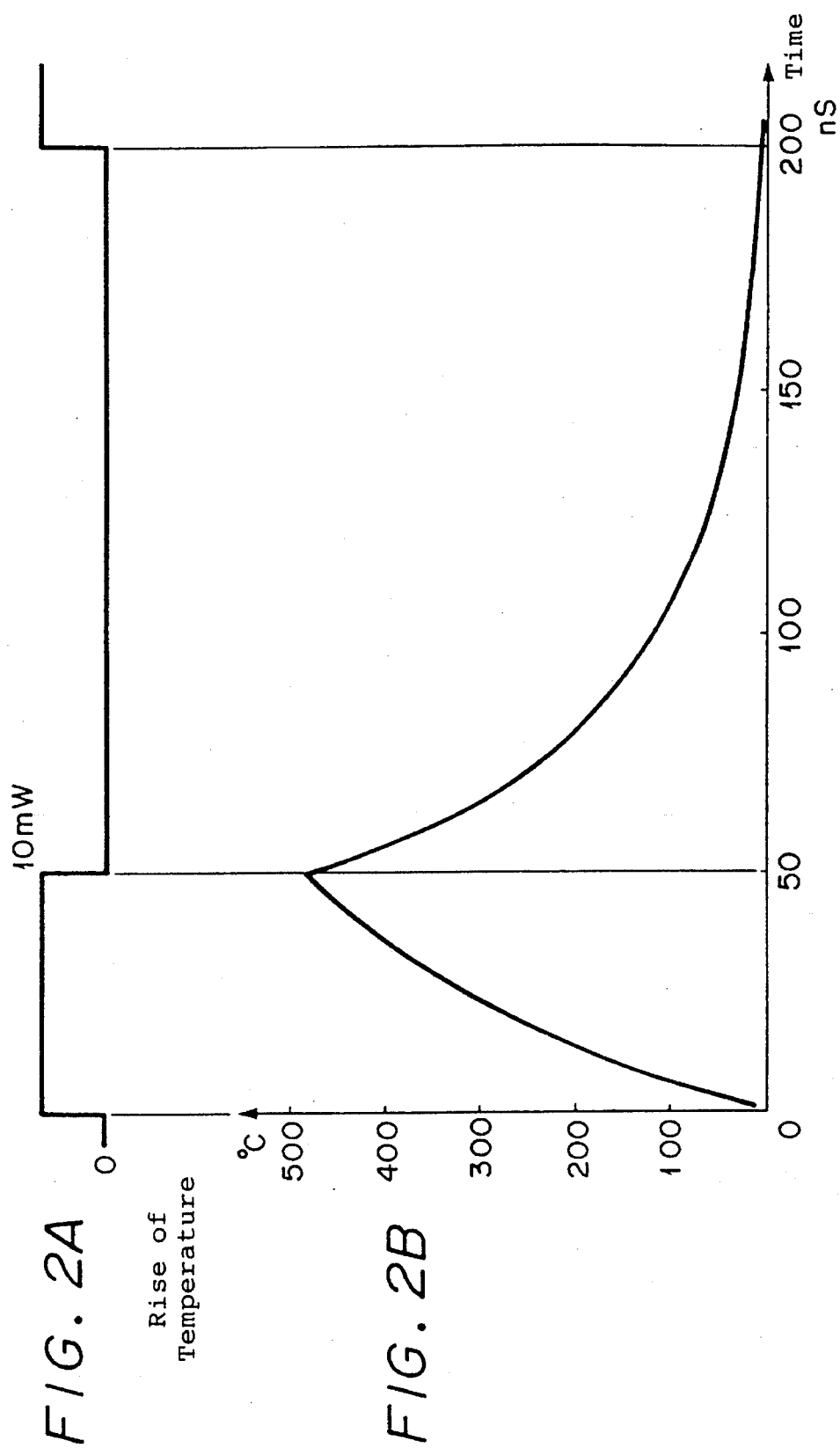
FIG. 2 is a timing chart for explaining operation of the conventional optical recording apparatus.
Figure 4:
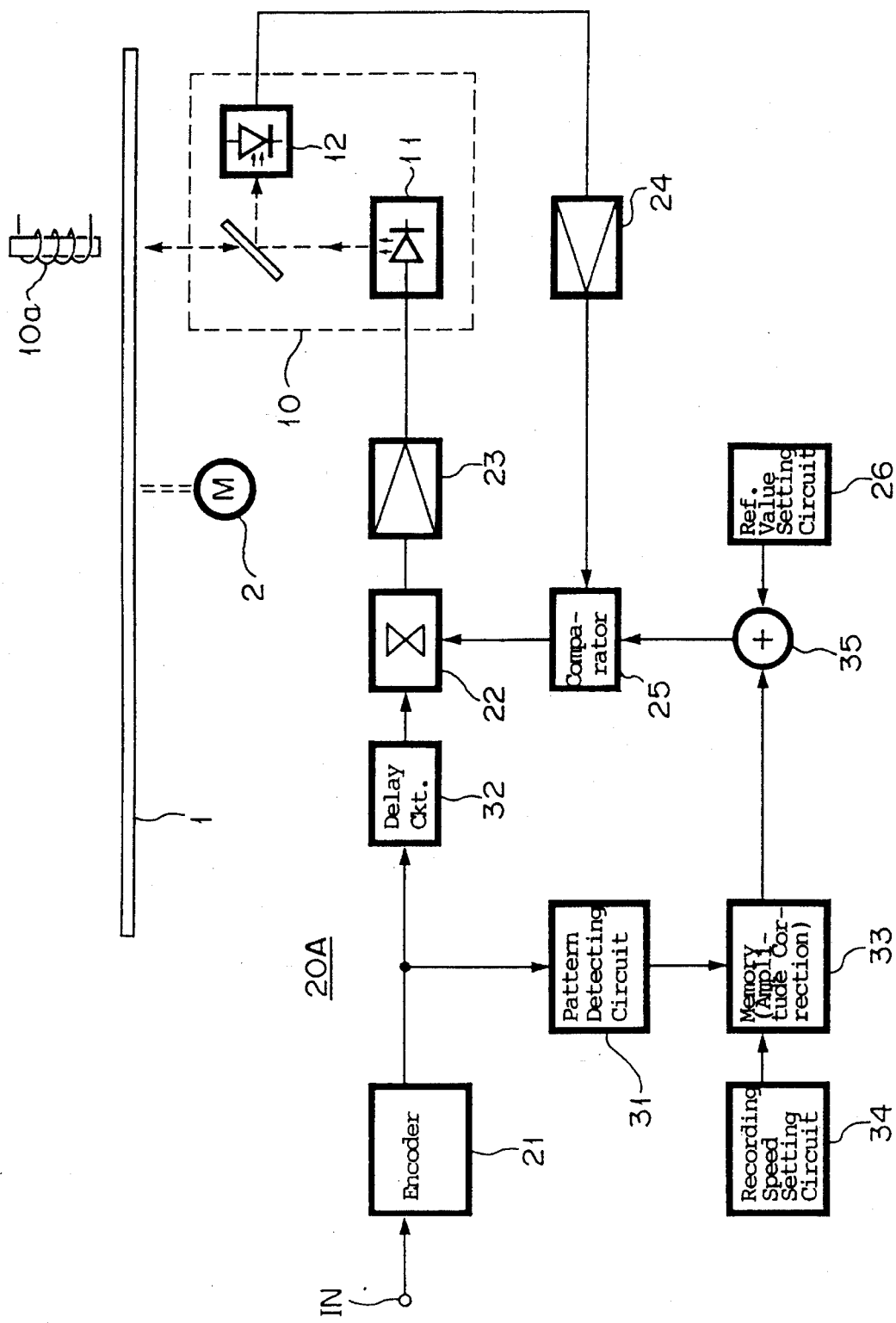
FIG. 4 is a block diagram illustrating the construction of an embodiment of an optical recording apparatus according to the present invention.
Figure 5:
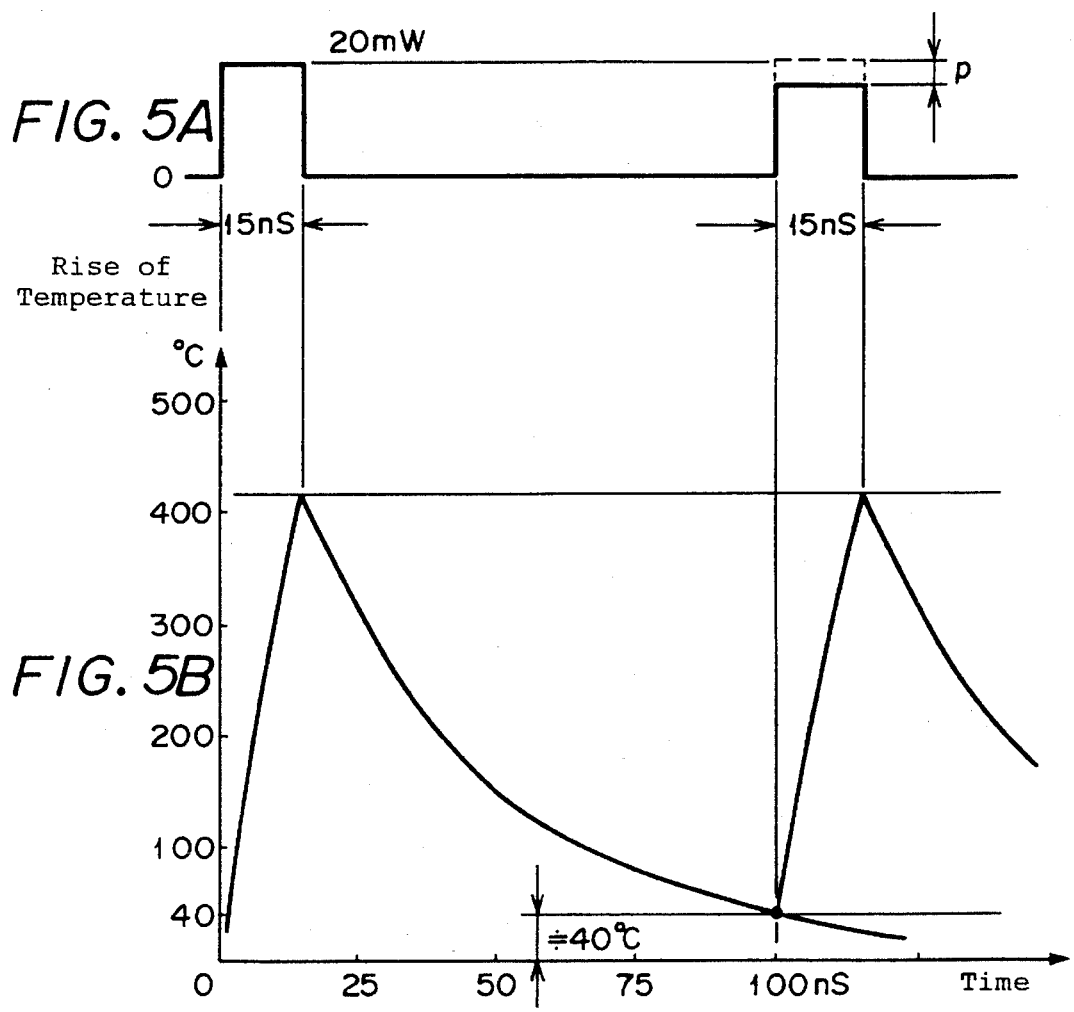
FIG. 5 is a timing chart for explaining operations of the embodiment of the present invention.

The construction of an embodiment of the present invention is shown in FIG. 4. In FIG. 4, elements corresponding to those of FIG. 1 are represented by the same reference numerals and the explanations thereof will be omitted.

In the embodiment of FIG. 4, reference numeral 20A denotes a recording circuit system having a pattern detecting circuit 31 for detecting a pulse pattern of a recording signal. In the recording circuit system, an output signal from an encoder 21 is supplied to the pattern detecting circuit 31 and also supplied to a modulation circuit 22 through a delay circuit 32 for compensating a signal processing time. Reference numeral 33 denotes a memory for correcting an amplitude to which an output of the pattern detecting circuit 31 and an output of a recording speed setting circuit 34 are supplied. A correction value from the memory 33 and a reference value from a reference value setting circuit 26 are added to each other in an adder 35 which in turn supplies an added value to a comparator 25. The rest of the construction is the same as that of the example of FIG. 1.

The embodiment of FIG. 4 operates in a manner described below.

When it is detected that an interval of a pulse pattern of the recording signal is less than a predetermined value by the pattern detecting circuit 31, the correction value previously stored in the memory 33 for correcting the amplitude is read out. The correction value is of course required to be compensated in accordance with a rotation speed of a disc, so that the previously stored correction value of the memory is compensated in accordance with a rotation speed of a disc by the recording speed setting circuit 34 and then the compensated correction value is delivered from the memory 33.

An output level of a light intensity modulation circuit 22, that is, an intensity level of a radiation light from a laser diode 11 is controlled in accordance with the compensated correction value and the reference value from the reference value setting circuit 26, so that a power level of a succeeding laser light pulse is lowered by p mW as shown in FIG. 5A.

An example of power level value in case of decreasing it will be explained hereinafter.

When data is recorded on a magneto-optical disc by a laser light beam with a linear velocity of 10 m/S, recording frequency of 12.5 MHz, pulse interval of 80 ns, and pulse width of 15 ns, for example, a succeeding pulse signal can be recorded with compensating influence of the remaining heat of a preceding pulse signal if an amplitude of the succeeding pulse signal is set to be about 83% of that of the preceding pulse signal at a room temperature. In this case, an amplitude of a further succeeding pulse signal succeeding to the succeeding pulse signal may be set to about 81% of that of the above-mentioned preceding pulse signal.

Now, a rate of decreasing an amplitude of a succeeding pulse signal relative to an amplitude of a normal pulse signal depends on a recording linear velocity, that is, a rotation speed of the magneto-optical disc and an atmospheric temperature where the recording is performed and also is required to be changed depending on a pulse interval between a preceding pulse signal and a succeeding pulse signal. A change of temperature of a recording medium of a magneto-optical disc will be shown by a graph of FIG. 9 wherein the abscissa and ordinate represent a time elapsed and temperature of the recording medium of the magnetic-optical disc, respectively, when a recording operation is performed with a power level of a recording light beam set to 20 mW under the above-described condition. As clear from FIG. 9, temperature of the recording medium decreases as time elapsed, so that the thermal influence of a succeeding pulse signal becomes less as an interval of the pulse signal becomes larger to thereby make an amount of correction of an amplitude of a succeeding pulse signal smaller. It is supposed from FIG. 9 that correction of an amplitude of a succeeeding pulse is scarcely required when a pulse interval is increased to about 160 ns.

Numerical values described above are only one example and so a correction value of an amplitude of a succeeding pulse signal varies depending on the above-described conditions.

Thus, by correcting an amplitude of a succeeding pulse signal, the temperature increasing rate of the recording layer of the magneto-optical disc 1 due to a succeeding laser light pulse becomes slight, so that a temperature of the recording layer at a time of termination of radiation of a succeeding laser light pulse increases merely to the same level as that at a time of termination of radiation of a preceding laser light pulse, thereby cancelling the influence of the remaining heat of the recording medium due to the preceding laser light pulse to make it possible to record a high-density pulse signal accurately.

Next, another embodiment of an optical recording apparatus according to the present invention will be explained with reference to FIGS. 6 to 8.

Figure 6:
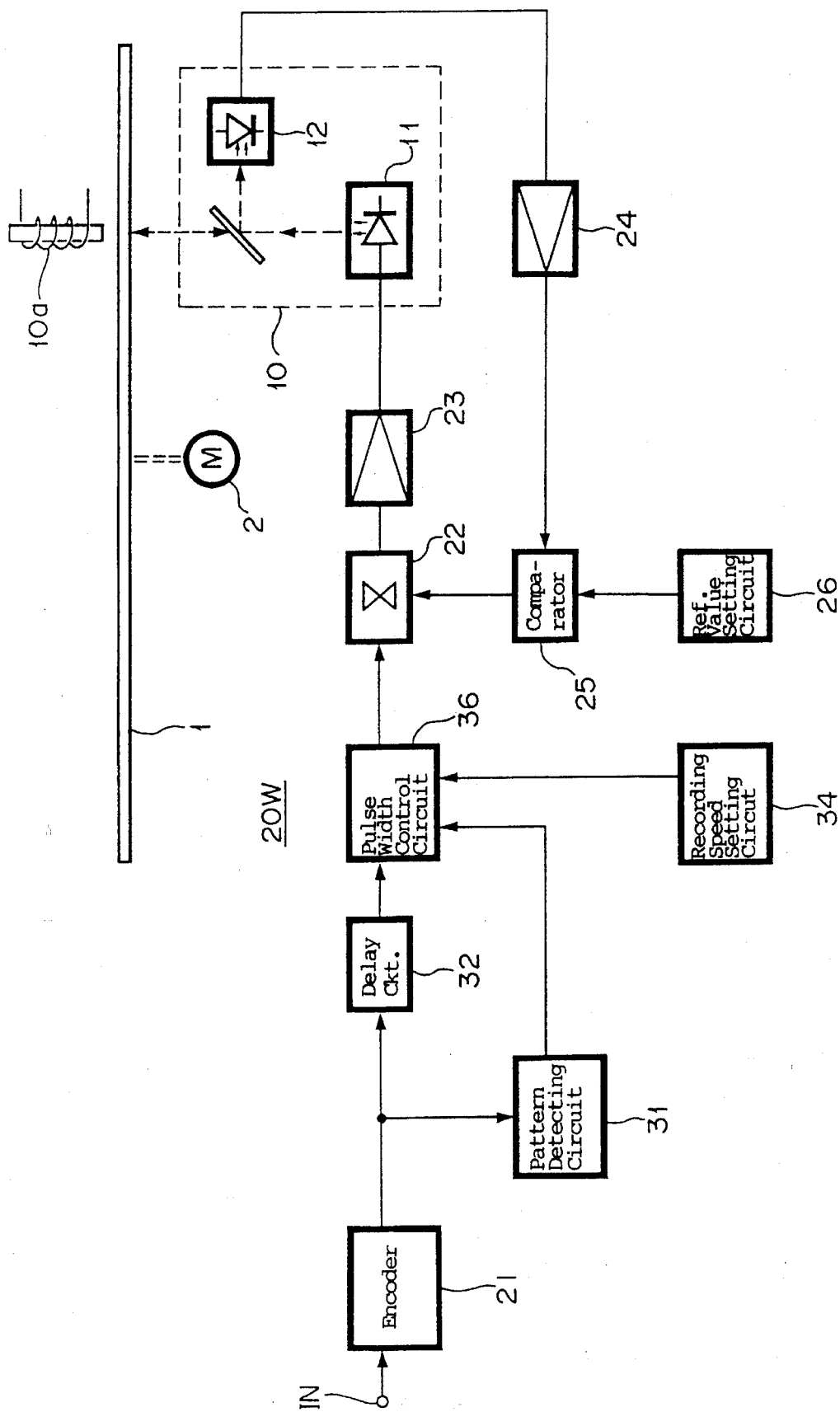
FIG. 6 is a block diagram illustrating the construction of another embodiment of the present invention.
Figure 7:
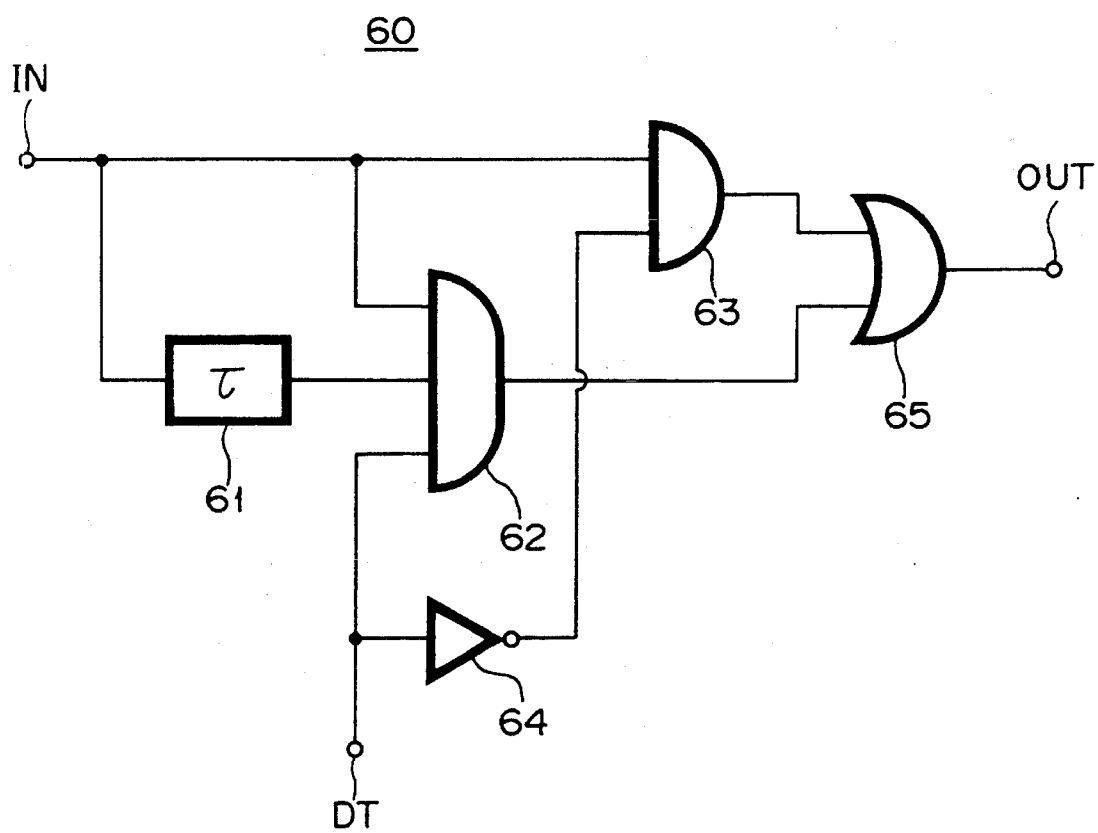
FIG. 7 is a block diagram illustrating a construction of main parts of another embodiment of the present invention.

The construction of another embodiment of the present invention is shown in FIG. 6 and the construction of main parts thereof is shown in FIG. 7. In FIG. 6, constituent elements corresponding to those shown in FIGS. 1 to 4 are represented by the same reference numerals and the explanation thereof is omitted.

In the embodiment of FIG. 6, reference numeral 20W denotes a recording circuit system having a pulse width control circuit 36 for controlling a pulse width of a recording signal. An output of an encoder 21 is supplied to a pattern detecting circuit 31 and also to the pulse width control circuit 36 through a delay circuit 32. The pulse width control circuit 36 also receives an output from a recording speed setting circuit 34 and delivers an output thereof to a modulation circuit 22 directly. Remaining constructions of elements are the same as the constructions of FIGS. 1 and 4.

In FIG. 7, reference numeral 60 denotes a pulse width control circuit corresponding to the pulse width control circuit 36 in FIG. 6. An input pulse from a terminal IN is supplied to each of a delay circuit 61 and AND gates 62 and 63 and an output of the delay circuit 61 with a delay time of τ is supplied to the AND gate 62. A detection signal from a terminal DT is directly applied to the AND gate 62 and also applied to the AND gate 63 through a NOT circuit 64. Output signals from the AND gates 62 and 63 are delivered to a terminal OUT through an OR gate 65.

Operation of the embodiment of FIG. 6 is as follows.

In the pulse width control circuit 60 in FIG. 7, when a level of the detecting signal at the terminal DT is "0", the AND gate 62 is closed but the AND gate 63 is opened to pass the input pulse from the terminal IN directly to the terminal OUT.

On the other hand, when a level of the detecting signal at the terminal DT is "1", the AND gate 62 is opened but the AND gate 63 is closed, so that the input pulse from the terminal IN is delayed at its leading edge by the time τ but not changed at a rear edge thereof to thereby be shortened in its pulse width by the time τ and delivered to the terminal OUT.

If it is detected that an interval of a pulse pattern of a recording signal is equal to or less than a predetermined value in the pattern detecting circuit 31 of FIG. 6, the control circuit 36 controls a pulse width of an input pulse applied thereto in accordance with the detecting signal representing this fact from the pattern detecting circuit in a manner that a leading edge of a succeeding laser light pulse is delayed by the time τ as shown in FIG. 8A.

An example of numerical values in case of decreasing a pulse width will be shown hereinafter. When data is recorded on a magneto-optical disc by a laser light beam with a linear velocity of 10 m/S, recording frequency of 12.5 MHz, pulse interval of 80 ns, and pulse width of 15 ns, for example, a succeeding pulse signal can be recorded with compensating influence of the remaining heat of a preceding pulse signal if a pulse width of the succeeding pulse signal is set to be 12 ns at a room temperature.

Now, a degree of decreasing a pulse width of a succeeding pulse signal relative to a pulse width of a normal pulse signal depends not only on a recording linear velocity and an atmospheric temperature where the recording is performed as a matter of course but also is required to be changed depending on a pulse interval between the preceding and succeeding pulse signals, as in the same manner in case of decreasing a rate of an amplitude of a pulse signal as described above. The relation between a pulse interval and a temperature of the recording medium of the magneto-optical disc is the same as that in case of decreasing an amplitude of a pulse signal as described above.

Figure 9:
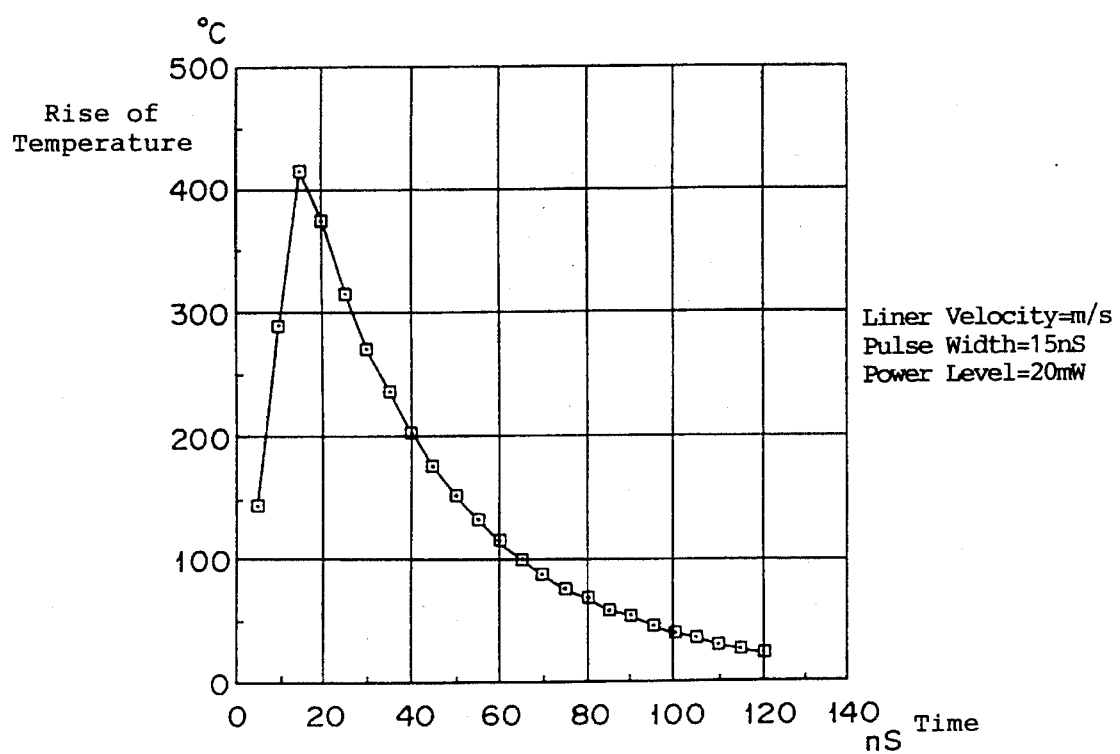
FIG. 9 is a graph for explaining the change in temperature of a recording medium.

Now, in case of performing this correction of changing the pulse width, a rising portion of the characteristic curve of FIG. 9 becomes non-linear if a width of a pulse signal becomes too wide, so that it is required to correct the pulse width by taking this fact into consideration.

Thus, by correcting a pulse width of a succeeding pulse signal, the radiation time period of a succeeding laser light pulse on the recording layer is shortened and so the temperature increasing rate of the recording layer of the magneto-optical disc 1 due to a succeeding laser light pulse becomes slight, so that a temperature of the recording layer at a time of termination of radiation of the succeeding laser light pulse increases merely to the same level as that at a time of termination of radiation of a preceding laser light pulse, as shown by a solid line in FIG. 8B, thereby cancelling the influence of the remaining heat of the recording medium due to a preceding laser light pulse to make it possible to record a high-density pulse signal accurately.

Now, in the embodiment of FIG. 6, the leading edge of the succeeding laser light pulse is delayed by the time τ, but the same effect can be obtained by shortening a pulse width of a laser light beam pulse in a manner of advancing a trailing edge thereof by a suitable time period or by shifting both the leading and trailing edges thereof by a suitable time period.

Explanations of the respective embodiments have been made in a case of using a magneto-optical disc as an example of optical discs but the present invention can be applied to any types of optical discs which are capable of recording data thereon. For example, the present invention can be applied to a recording apparatus which mounts an optical disc such as a rewritable type optical disc of a phase change type using a chalcogenide thin film or a write-once type optical disc using tellurium oxide, or the like.

As described above in detail, according to the present invention, if it is determined by detecting a pulse pattern of a recording signal that a pulse interval is equal to or less than a predetermined value, an amplitude of a succeeding pulse signal is decreased or shortened to thereby decrease a radiation energy of a laser light pulse, so that there can be provided with an optical recording apparatus which can cancel the influence of the remaining heat of the recording medium due to a preceding laser light pulse to make it possible to record a high-density pulse signal accurately.

We claim:

1. An optical recording apparatus wherein a modulation signal based on recording data is supplied to light intensity modulating means of a laser light source and a light beam for the laser light source is radiated on an optical recording medium to record data thereon, comprising:

pattern detecting means for detecting a pulse pattern of the modulation signal based on the recording data; and control means for providing amplitude correction data to said laser light source when said pattern detecting means detects a plurality of signal pulses with an interval less than or equal to a predetermined value, wherein said control means comprises means for decreasing the amplitude of a succeeding signal pulse based on a detected output from said pattern detecting means, and recording speed setting means for setting a rotating speed of the recording medium as it is rotating and producing a speed signal having a value directly related to the rotating speed of the recording medium, whereby said control means further controls an amplitude of the succeeding signal pulse by decreasing it as the value of the speed signal produced by said recording speed setting means increases and the interval between signal pulses correspondingly decreases.

2. An optical recording apparatus according to claim 1, wherein said pattern detecting means generates a detection output when an interval between a succeeding signal pulse and a pulse preceding the succeeding signal pulse becomes less than or equal to the predetermined value.

3. An optical recording apparatus wherein a modulation signal based on recording data is supplied to light intensity modulating means of a laser light source and a light beam from the laser light source is radiated on an optical recording medium to record data thereon, comprising:

pattern detecting means for detecting a pulse pattern of the modulation signal based on the recording data; and pulse width control means, said pulse width control means adapted to shorten a pulse width of a succeeding signal pulse when said pattern detection means detects a pulse interval less than or equal to a predetermined value, wherein said control means comprises recording speed setting means for setting a rotating speed of the recording medium as it is rotating and producing a speed signal having a value directly related to the rotating speed of the recording medium, so that said control means controls a pulse width of the succeeding signal pulse to decrease it as the value of the speed signal produced by said recording speed setting means increases and the interval between signal pulses correspondingly decreases.

4. An optical recording apparatus according to claim 3, wherein said pattern detecting means generates a detection output when an interval between the succeeding pulse signal and a pulse preceding the succeeding signal pulse becomes less than or equal to the predetermined value.

* * * * *